United States Patent [19]

Delrue et al.

[11] Patent Number: 5,360,844
[45] Date of Patent: Nov. 1, 1994

[54] ARTICLES MANUFACTURED WITH A COMPOSITION CONTAINING A POLYMER OF UNSATURATED HYDROCARBON, A $C_{1-4}$ ALKYL OR HYDROXYALKYLETHER OF STARCH AND A VINYL OR ACRYL POLYMER AS A COMPATIBILIZING AGENT

[75] Inventors: Rita M. Delrue, Bergen of Zoom; Anton L. German, Eindhoven; Henricus E. H. Meijer, Veldhoven; Antonius H. Zijderveld, Vaassen; Jan Bussink, Bergen of Zoom, all of Netherlands

[73] Assignee: Cargill, Incorporated, Minneapolis, Minn.

[21] Appl. No.: 178,910

[22] Filed: Jan. 7, 1994

Related U.S. Application Data

[62] Division of Ser. No. 89,719, Jul. 9, 1993, Pat. No. 5,296,526, which is a division of Ser. No. 744,943, Aug. 14, 1991, Pat. No. 5,234,978.

[30] Foreign Application Priority Data

Aug. 15, 1990 [NL] Netherlands ............... 9001826

[51] Int. Cl.$^5$ ............................................. C08L 3/08
[52] U.S. Cl. ............................ 524/50; 524/387; 524/388
[58] Field of Search ....................... 524/50, 387, 388

[56] References Cited

U.S. PATENT DOCUMENTS

| | | | |
|---|---|---|---|
| 2,458,191 | 1/1949 | Nichols, Jr. et al. | 524/50 |
| 3,117,014 | 1/1964 | Klug | 106/213 |
| 3,117,021 | 1/1964 | Klug | 117/104 |
| 3,706,731 | 12/1972 | Hjermstad | 536/111 |
| 3,949,145 | 4/1976 | Otey et al. | 428/423 |
| 3,976,605 | 8/1976 | Matsunaga et al. | 521/88 |
| 3,992,496 | 11/1976 | Matsunaga et al. | 264/49 |
| 4,016,117 | 4/1977 | Griffin | 523/128 |
| 4,021,338 | 5/1977 | Hankin | 210/63 R |
| 4,045,388 | 8/1977 | Matsunaga et al. | 524/27 |
| 4,125,495 | 11/1978 | Griffin | 524/51 |
| 4,133,784 | 1/1979 | Otey et al. | 523/128 |
| 4,156,666 | 5/1979 | Odate et al. | 523/125 |
| 4,337,181 | 6/1982 | Otey et al. | 523/128 |
| 4,464,202 | 8/1984 | Andres et al. | 106/39 |
| 4,863,655 | 9/1989 | Lacourse et al. | 264/53 |
| 5,070,122 | 12/1991 | Vanderbilt et al. | 524/47 |
| 5,075,054 | 3/1992 | Lay et al. | 524/47 |

FOREIGN PATENT DOCUMENTS

| 0032802 | 7/1981 | European Pat. Off. |
| 0157643 | 12/1980 | Japan . |

OTHER PUBLICATIONS

Griffin and Mivetchi, "Biodegration of Ethylene/Vinyl Acetate Copolymers", 87 Plastics Manuf. at 13 (1977) 87:23921m.

Bagley, Fanta, Burr, Doane and Russel, "Graft Copolymers of Polysaccharides with Thermoplastic Polymers".

"A New Type of Filled Plastic" 17 Polym. Eng. Sci. at 311–316 (1977).

Ray-Chaudhari "Grafted Starch Acylates and Their Properties":21 Die Starke at 47–52 (1969).

Otey, Westhoff and Russell "Biodegradable Films from Starch and Ethylene–Acrylic Acid Copolymer" 87 Plastics Manuf. at 33 (1977) 87:185424d.

Otey, Westhoff and Russel, "Biodegradable Films from Starch and Ethylene–Acrylic Acid Copolymer", 16 Ed. Eng. Chem., Prod. Res. Dev. at 305–308 (1977).

Otey, Westhoff and Doane "Starch-Based Blow Films", 19 Ed. Eng. Chem. Prod. Res. Dev. at 592–595 (1980).

Encycl. Polym. Sci Technology Supply. No. 2, at 665–699, preferably at 665–669, (1977).

Primary Examiner—Judy M. Reddick
Attorney, Agent, or Firm—Fitch, Even, Tabin & Flannery

[57] ABSTRACT

Articles manufactured with a composition comprising a polymer of an unsaturated hydrocarbon, a $C_{1-4}$ alkyl or hydroxyalkylether of starch having a degree of substitution of at least 0.25, and a polyhydric aliphatic alcohol having 2 to 10 carbon atoms and 2 to 6 hydroxyl groups; wherein the compatibilizing agent can be a vinyl copolymer, acrylic copolymer and mixtures thereof. The composition can be used in the preparation of biodegradable plastics.

2 Claims, No Drawings

ARTICLES MANUFACTURED WITH A COMPOSITION CONTAINING A POLYMER OF UNSATURATED HYDROCARBON, A $C_{1-4}$ ALKYL OR HYDROXYALKYLETHER OF STARCH AND A VINYL OR ACRYL POLYMER AS A COMPATIBILIZING AGENT

This is a division, of application Ser. No. 08/089,719, now U.S. Pat. Nos. 5,296,526, filed Jul. 9, 1993, which is a division of U.S. application Ser. No. 07/744,943, now U.S. Pat. No. 5,234,978, filed Aug. 14, 1991.

This invention relates to a composition containing a polymer of unsaturated hydrocarbon, a $C_{1-4}$ alkyl or hydroxyalkylether of starch having a degree of substitution of at least 0.25 and a vinyl or acryl polymer as a compatibilizing agent.

Dutch patent application 8902321, which is not a prior publication, discloses a composition which contains a polymer of unsaturated hydrocarbon and a $C_{1-4}$ alkyl or hydroalkyl starch ether having a degree of substitution of at least 0.25 for improving the biodegradability, and furthermore a compatibilizing agent. A vinyl or acryl copolymer is used as the compatibilizing agent, in particular, a copolymer of ethylene not vinyl acetate (EVA) or a copolymer of ethylene and acrylic acid (EAA). In this way, a relatively high percentage of starch derivative can be incorporated into the material. From these compositions, objects and in particular packaging films can be made. According to said Dutch application it is preferred to add a higher carboxylic acid, such as stearic acid, oleic acid or di-oleic acid, as a plasticizer or lubricant; said carboxylic acid also acts as a dispersant.

According to this invention, the present composition also contains a polyhydric aliphatic alcohol having 2-10 carbon atoms and 2-6 hydroxy groups as a dispersant/plasticizer/lubricant for the starch ether. The alcohol has a better dispersing action than the carboxylic acid used in Dutch patent application 8902321. The alcohol provides better properties in terms of strength, elasticity and film forming, compared to the use of carboxylic acid as disclosed in Dutch application 8902321.

DE-A-1,470,846 discloses a combination of an alkyl or hydroxyalkyl starch ether, specifically a hydroxyethyl starch ether or a hydroxypropyl starch ether, having the above-mentioned degree of substitution, an alcohol such as propylene glycol, diethylene glycol or glycerine as a plasticizer therefore, as well as water in an amount of 1-20% by weight. However, this reference does not mention a hydrocarbon polymer or any other polymer to be used in combination with the starch derivative, and therefore, also a compatibilizing agent is not disclosed. Furthermore, in contrast to the present application, water has to be present according to this reference.

This invention also relates to a process for preparing such a composition, as well as to products which have been made by means of this composition or with the use of said process.

As in Dutch application 8902321, the polymers of unsaturated hydrocarbons to be used are in the first place polyolefins, such as the different kinds of polyethylene and polypropylene, and furthermore polystyrene, as well as copolymers of these unsaturated hydrocarbons; in particular, ethylene polymers are used.

As in Dutch application 8902321, the degree of substitution of the etherified starch should be at least 0.25 and preferably 0.4–1.0, while the preferred starch ethers are hydroxypropyl ethers, obtained by condensation of starch with propylene oxide. As is also disclosed in this reference, this condensation is preferably carried out using alkaline catalysis, in particular with NaOH, whereby a statistic distribution of the products occurs.

As in Dutch application 8902321, copolymers of ethylene and vinyl acetate (EVA) or of ethylene and acrylic acid (EAA) are preferably used as compatibilizing vinyl or acryl copolymers. Furthermore, terpolymers of ethylene, vinyl acetate and (meth)acrylic acid can be mentioned.

Examples of the polyhydric alcohol used in this invention as dispersant/plasticizer/lubricant are ethylene glycol, propylene glycol, glycerine, butylene glycol, diethylene glycol, pentaerythritol and dipentaerythritol. Ethylene glycol, propylene glycol and pentaerythritol are preferred, and of these compounds ethylene glycol is most preferred.

The present polyhydric alcohols are used in amounts which cause to swell or partially dissolve the starch ether, and they should not be used in such a large amount that a complete dissolution is achieved. For example, the preferred hydroxypropyl starch dissolves in ethylene glycol in an amount of 30% at 75° C. and in propylene glycol in an amount of 40%, while this compound dissolves in glycerol in an amount of 10% at 100° C.

Preferably, 20–70% by weight of polymer of unsaturated hydrocarbon, 20–80% by weight of starch ether, 11–19% by weight of compatibilizing copolymer and 2–8% by weight of polyhydric alcohol is used in the composition of this invention.

Because processing the mixture always involves a heating step, the polyhydric alcohol can completely develop its swelling or partially dissolving action.

A preferred process for preparing the present composition comprises extruding together the starch ether and the polyhydric alcohol and thereafter mixing the thus-obtained homogeneous mixture with the other components and extruding said mixture.

Although the invention is not dependent on or restricted by theoretical considerations, it is believed that the hydrogen bondings of the starch are disrupted by the etherification, whereafter the polyhydric alcohol causes a further disentanglement of the starch molecules, so that the starch particles are present independently of each other and can be substantially completely molecularly dispersed. Sometimes this leads to clear beads when the starch ether and the polyhydric alcohol are extruded together.

The composition of this invention is excellently suitable for the manufacture of films, but also of three-dimensional objects. Furthermore, starch ethers and the polyhydric alcohol used are cheap materials, cheaper than the hydrocarbon polymer. A perfect composition containing 50% of starch ether can be obtained easily, and also higher percentages of starch ether are suitable. Of course, the optimal percentage of starch ether will also depend on the use of the composition.

The following non-limiting examples illustrate this invention.

EXAMPLE I

A mixture of hydroxypropyl starch having a degree of substitution of 0.5% and 10% by weight of ethylene glycol, based on the starch, was extruded at 75° C. and clear beads were thus obtained. 55 parts by weight of the beads were admixed with 15 parts by weight of EAA and 30 parts by weight of low density polyethylene (LLDPE). This mixture was extruded and films were made. These films had a tensile strength of 12.6 MPa/mm$^2$ (about 50% of the value of LLDPE as such) and a yield value of 12.3, as compared to only 10.1 for polyethylene as such. Furthermore, the film showed an elongation at break of 330%. This combination of properties makes the film outstandingly suitable as packaging film, which has the additional advantage of being biodegradable.

EXAMPLE II

Two mixtures, A and B, of linear low pressure polyethylene (LLDPE), hydroxypropyl starch (HPS) having a degree of substitution of 0.5% and EAA (ethylene acrylic acid copolymer) as a compatibilizing agent and stearic acid were prepared. The compositions of the mixture are indicated in the table below. The mixtures were heated to 180° C. in an extruder and extruded to form granulates, and the granulates were made into film by extrusion-blowing. Composition A could not be made into a film. Furthermore, two mixtures, C and D, having the same compositions as A and B, respectively, except that these mixtures contained 5 parts by weight of glycol instead of 5 parts by weight of stearic acid, were prepared and made into films according to the same procedure.

TABLE

|  | parts by weight | | | |
|---|---|---|---|---|
|  | *A | *B | C | D |
| LLDPE | 30 | 50 | 30 | 50 |
| HPS | 50 | 30 | 50 | 30 |
| EAA | 15 | 15 | 15 | 15 |
| Stearic acid | 5 | 5 | — | — |
| Glycol | — | — | 5 | 5 |
| Tensile strength, MPa/m$^2$ | —[1] | 18.9 | 12.3 | 14.6 |
| Elongation at break, % | —[1] | 360 | 330 | 640 |

*Comparative Composition
[1] Composition A could not be made into films.

As appears from the above table, composition A, which contained stearic acid, could not be made into films, while compositions C, which is identical to composition A except for the fact that C contains glycol instead of stearic acid, could be made into films having desirable properties.

Composition D, containing glycol, has a better balance of properties than composition B, which differs from composition D in that B contains stearic acid instead of glycol.

EXAMPLE III

The following 2 mixtures were prepared and made into films using the method of example II. The HPS, EAA and LLDPE were the same as in the previous examples.

|  | parts by weight | |
|---|---|---|
|  | 1[a] | *2 |
| HFS | 50 | 50 |
| Ethylene glycol | 5 | — |
| Glycerol | — | 5 |
| EAA | 15 | 15 |
| LLDPE | 30 | 30 |
| Tensile strength, MPa/mm$^2$ | 12.3 | 9.8 |
| Elongation at break, % | 330 | 280.0 |

[a] Compsition 1 is identical to item C in example II.
*Comparative Composition

What is claimed is:

1. Articles produced from a composition containing a polymer of an unsaturated hydrocarbon, a $C_{1-4}$ alkyl or hydroxyalkyl ether of starch having a degree of substitution of at least 0.25 and a compatibilizing agent selected from the group consisting of copolymers of ethylene-vinyl acetate, ethylene-acrylic acid, and terpolymers of ethylene-vinyl acetate-(meth)acrylic acid, wherein the composition also contains a polyhydric aliphatic alcohol having 2–10 carbon atoms and 2–6 hydroxyl groups as a dispersant/plasticizer/lubricant for the starch ether.

2. Articles produced from a composition containing a polymer of an unsaturated hydrocarbon, a $C_{1-4}$ alkyl or hydroxyalkyl ether of starch having a degree of substitution of at least 0.25 and a compatibilizing agent selected from the group consisting of copolymers of ethylene-vinyl acetate, ethylene-acrylic acid, vinyl acetate-(meth) acrylic acid and terpolymers of ethylene-vinyl acetate-(meth) acrylic acid, wherein the composition also contains a polyhydric aliphatic alcohol having 2–10 carbon atoms and 2–6 hydroxy groups as a dispersant/plasticizer/lubricant for the starch ether, wherein said composition is prepared by a process which comprises extruding the starch ether and the polyhydric alcohol together as a homogeneous material and thereafter admixing this material with the other components and extruding this mixture.

* * * * *

UNITED STATES PATENT AND TRADEMARK OFFICE
CERTIFICATE OF CORRECTION

PATENT NO. : 5,360,844
DATED : November 1, 1994
INVENTOR(S) : Delrue, Rita Marie It is certified that error appears in the above-indentified patent and that said Letters Patent is hereby corrected as shown below:

At column 4, line 28, after "acid" insert --vinyl acetate-(meth) acrylic acid,--.

At column 4, line 43, change "hydroxy" to --hydroxyl--.

Signed and Sealed this

Twenty-first Day of February, 1995

*Attest:*

BRUCE LEHMAN

*Attesting Officer*     *Commissioner of Patents and Trademarks*